United States Patent
Lee et al.

(10) Patent No.: US 9,598,019 B2
(45) Date of Patent: Mar. 21, 2017

(54) VARIABLE DEFLECTOR APPARATUS FOR SIDE STEP OF VEHICLE

(71) Applicant: Hyundai Motor Company, Seoul (KR)

(72) Inventors: Seung Mok Lee, Osan-si (KR); Dong Eun Cha, Suwon-si (KR); Jin Young Yoon, Gimpo-si (KR); Hyun Gyung Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/820,351

(22) Filed: Aug. 6, 2015

(65) Prior Publication Data

US 2016/0264057 A1  Sep. 15, 2016

(30) Foreign Application Priority Data

Mar. 13, 2015  (KR) .................. 10-2015-0034804

(51) Int. Cl.
*B60R 3/02* (2006.01)
*B60R 3/00* (2006.01)
*B62D 35/00* (2006.01)

(52) U.S. Cl.
CPC .............. *B60R 3/002* (2013.01); *B60R 3/02* (2013.01); *B62D 35/008* (2013.01)

(58) Field of Classification Search
None
See application file for complete search history.

(56) References Cited

U.S. PATENT DOCUMENTS

2009/0295190 A1* 12/2009 Kottenstette ......... B62D 35/005
296/180.3

FOREIGN PATENT DOCUMENTS

| JP | 6-20174 U | 3/1994 |
| JP | 6020174 Y2 * | 5/1994 |
| JP | 6-305452 A | 11/1994 |
| JP | 2008-260401 A | 10/2008 |
| JP | 2009-107446 A | 5/2009 |
| KR | 10-2005-0031491 A | 4/2005 |
| KR | 10-2007-0012915 A | 1/2007 |
| KR | 10-0719516 B1 | 5/2007 |
| KR | 10-2011-0098881 A | 9/2011 |

* cited by examiner

*Primary Examiner* — John Walters
*Assistant Examiner* — Hilary L Johns
(74) *Attorney, Agent, or Firm* — Morgan, Lewis & Bockius LLP

(57) ABSTRACT

A variable deflector apparatus for a side step of a vehicle may include a drive device, a side deflector operated by power transmitted from the drive device, the side deflector configured to be received in the side step when the side deflector is not deployed and to be perpendicularly drawn out downwards from the side step when the side deflector is deployed, thus improving aerodynamic performance of the vehicle, and a front deflector connecting a front end of the side step with a front end of the side deflector, the front deflector being kept folded when the side deflector is not deployed and configured to be unfolded to cover a lower portion of the front end of the side step when the side deflector is deployed, thus improving the aerodynamic performance of the vehicle.

8 Claims, 6 Drawing Sheets

VARIABLE DEFLECTOR APPARATUS FOR SIDE STEP OF VEHICLE

CROSS-REFERENCE(S) TO RELATED APPLICATION

The present application claims priority to Korean Patent Application No. 10-2015-0034804, filed Mar. 13, 2015, the entire contents of which is incorporated herein for all purposes by this reference.

BACKGROUND OF THE INVENTION

Field of the Invention

The present invention relates to a variable deflector apparatus for a side step of a vehicle. More particularly, the invention relates to a variable deflector apparatus for a side step of a vehicle, which is capable of improving aerodynamic performance of the vehicle equipped with the side step.

Description of Related Art

A recreational vehicle (RV) that is higher in height than a passenger vehicle is provided with a side step 100 as shown in FIG. 1, for the purpose of allowing a passenger to get on or off As such, since the vehicle equipped with the side step 100 is mainly configured such that the side step 100 is fixedly mounted to a vehicle body 200 (side sill panel), the aerodynamic performance of the vehicle is deteriorated due to the side step 100 protruding laterally when the vehicle is being driven, and consequently, fuel efficiency is undesirably reduced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a variable deflector apparatus, which is mounted to a side step so as both enhance the aerodynamic performance of a vehicle equipped with the side step and improve fuel efficiency.

Further, various aspects of the present invention are directed to providing a variable deflector apparatus for a side step, which is received in the side step before an operation to reinforce the side step and is drawn out downwards and forwards from the side step during the operation to improve the aerodynamic performance of the vehicle.

Various aspects of the present invention are additionally directed to providing a variable deflector apparatus mounted to a side step, in which an extent to which the apparatus is drawn out from the side step depending on a vehicle speed is automatically adjusted, thus optimally improving the aerodynamic performance of a vehicle.

According to various aspects of the present invention, a variable deflector apparatus for a side step of a vehicle may include a drive device, a side deflector operated by power transmitted from the drive device, the side deflector configured to be received in the side step when the side deflector is not deployed and to be perpendicularly drawn out downwards from the side step when the side deflector is deployed, thus improving aerodynamic performance of the vehicle, and a front deflector connecting a front end of the side step with a front end of the side deflector, the front deflector being kept folded when the side deflector is not deployed and configured to be unfolded to cover a lower portion of the front end of the side step when the side deflector is deployed, thus improving the aerodynamic performance of the vehicle.

The variable deflector apparatus may further include a vehicle-speed sensor, and a controller configured to receive a signal from the vehicle-speed sensor to control an operation of the drive device.

The variable deflector apparatus may further include a plurality of support plates provided on an underside of the side deflector in such a way as to be spaced apart from each other in a direction from a front to a rear, a connecting shaft integrally connecting the support plates with each other, and a driven gear coupled to the connecting shaft, the driven gear being coupled to the drive device to transmit power therebetween.

The drive device may include a motor fixedly mounted to a vehicle body in an indoor direction of the vehicle, and a drive gear coupled to a shaft of the motor and engaged with the driven gear to transmit power therebetween.

The side deflector may be in close contact with an underside of a side-step reinforcement when the side deflector is not deployed, thus reinforcing the side step.

The side deflector may be configured to maintain a state in which the side deflector is perpendicularly deployed downwards from a lower portion of an end of the side step in the indoor direction.

The front deflector may include a fixed bracket coupled to a front end of the side-step reinforcement, a rotary bracket fixedly coupled to the front end of the side deflector, a plurality of intermediate brackets positioned between the fixed bracket and the rotary bracket, and rotatably hinged at first ends thereof to an end where the fixed bracket overlaps the rotary bracket, each of the intermediate brackets configured to be folded between the fixed bracket and the rotary bracket when the side deflector is not deployed and to be radially unfolded when the side deflector is deployed, and a cover plate connecting the fixed bracket, the rotary bracket and the intermediate brackets, thus covering space between the fixed bracket, the rotary bracket and the intermediate brackets when the side deflector is deployed.

An extent to which the side deflector may be configured to be drawn out downwards from the side step may be increased, as a vehicle speed increases.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A conventional vehicle equipped with a side step 100 protruding laterally from a vehicle body 200 (side sill panel) has drawbacks in that the aerodynamic performance of the vehicle is deteriorated due to the side step 100 protruding laterally when the vehicle is being driven, and fuel efficiency is also reduced. Therefore, the present invention is intended to improve the aerodynamic performance (lift, drag) of the vehicle equipped with the side step using a variable deflector.

Figure 1:
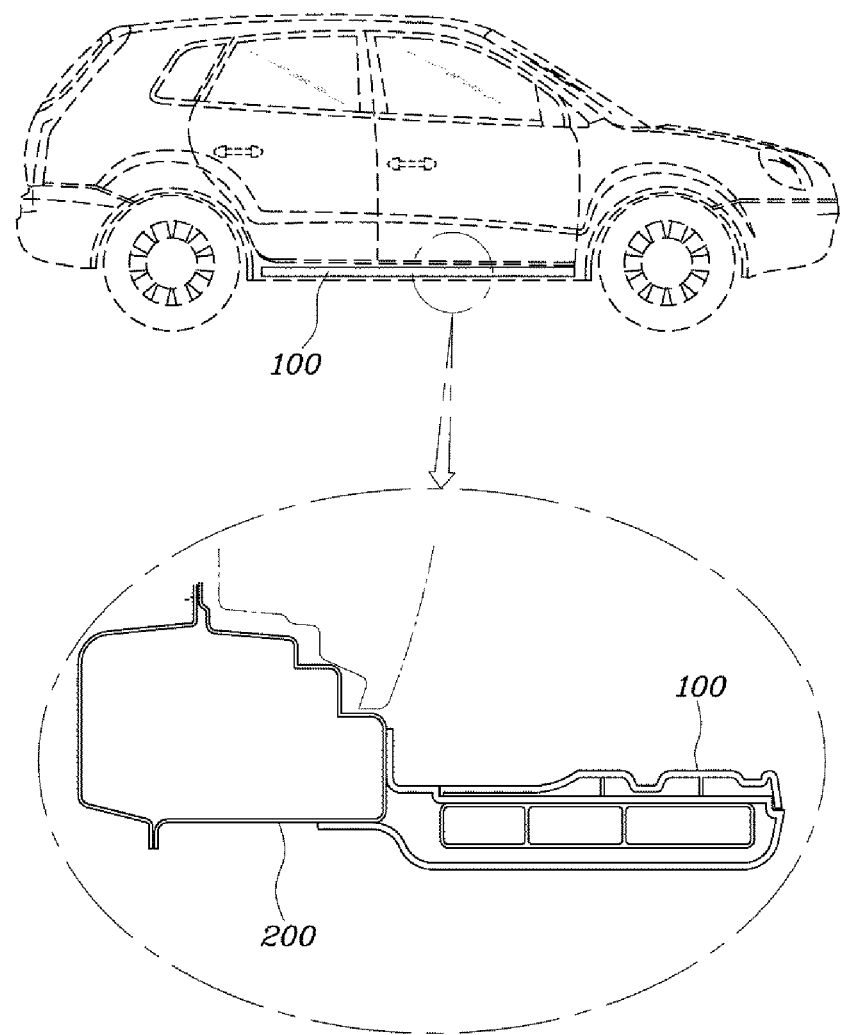
FIG. 1 is a view illustrating a conventional side step having no deflector.
Figure 2:
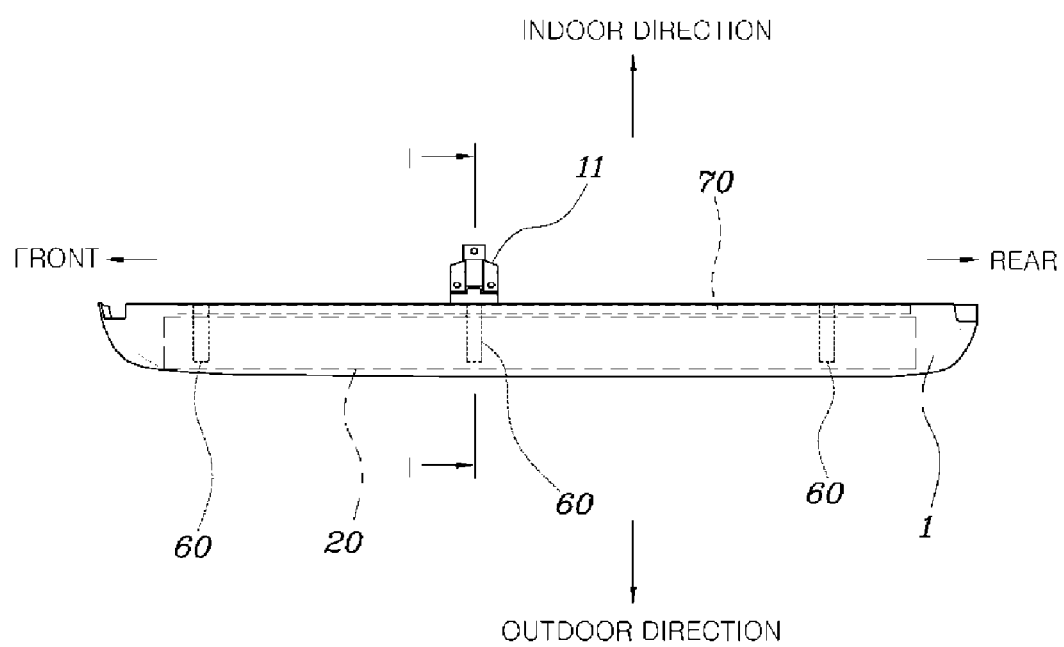
FIG. 2 is a plan view showing a side step of a vehicle equipped with an exemplary variable deflector apparatus according to the present invention.
Figure 3:
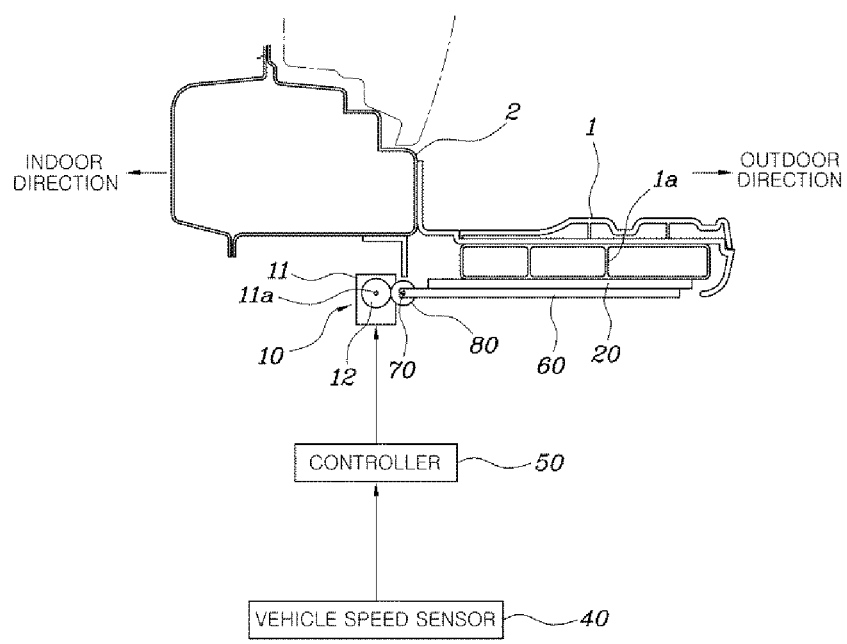
FIG. 3 is a sectional view taken along line I-I of FIG. 2, in which a side deflector is not deployed.
Figure 4A:
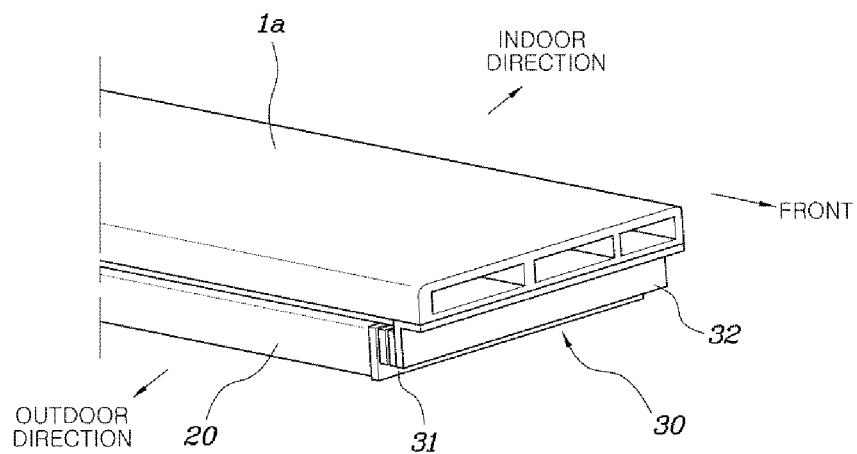
FIG. 4A and FIG. 4B are views showing a state in which a front deflector according to the present invention is not deployed.
Figure 4B:
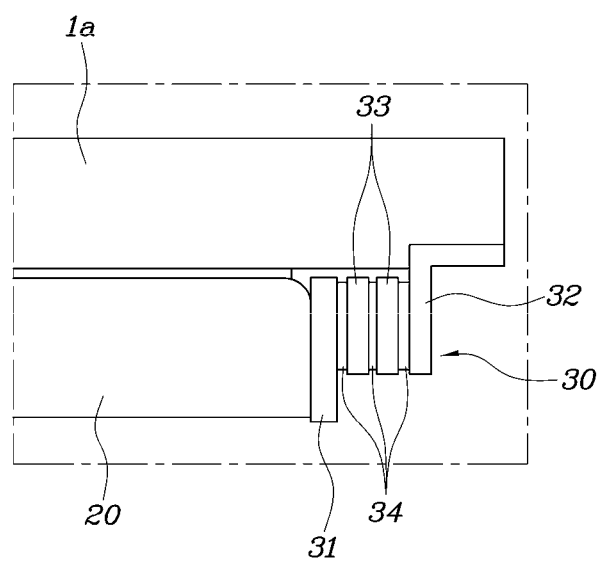
Figure 5:
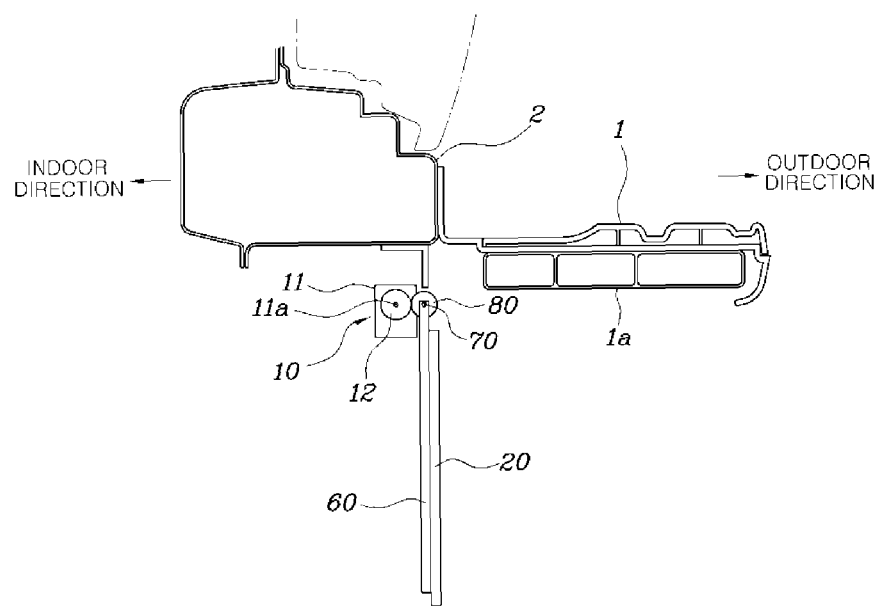
FIG. 5 and FIG. 6 are views showing states in which the side deflector and the front deflector according to the present invention are deployed.
Figure 6:
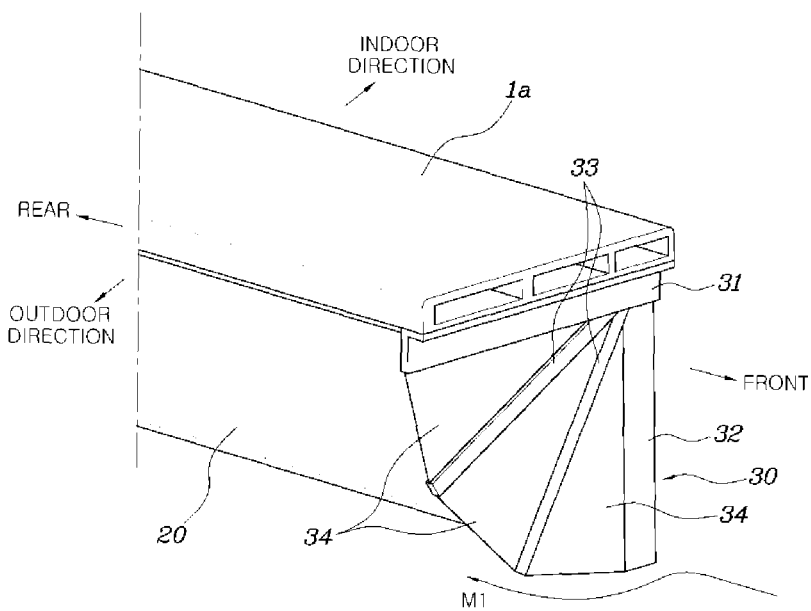

As shown in FIG. 2 to FIG. 6, a variable deflector apparatus for a side step of a vehicle according to the present invention includes a drive device 10, a side deflector 20, and a front deflector 30. The side deflector 20 is operated by power transmitted from the drive device 10, and is received in the side step 1 when the side deflector 20 is not deployed and is perpendicularly drawn out downwards from the side step 1 when the side deflector 20 is deployed, thus improving aerodynamic performance of the vehicle. The front deflector 30 connects a front end of the side step 1 with a front end of the side deflector 20. The front deflector 30 is kept folded when the side deflector 20 is not deployed and is unfolded to cover a lower portion of the front end of the side step 1 when the side deflector 20 is deployed, thus improving the aerodynamic performance of the vehicle.

Also, the apparatus of the present invention further includes a vehicle-speed sensor 40 to implement a variable deflector, and a controller 50 receiving a signal from the vehicle-speed sensor 40 to control an operation of the drive device 10.

The apparatus further includes a plurality of support plates 60 provided on an underside of the side deflector 20 in such a way as to be spaced apart from each other in a direction from a front to a rear, a connecting shaft 70 integrally connecting the support plates 60 with each other, and a driven gear 80 coupled to the connecting shaft 70. Here, the driven gear 80 is coupled with the drive device 10 to transmit power therebetween.

The drive device 10 includes a motor 11 fixedly mounted to a vehicle body 2 in an indoor direction, and a drive gear 12 coupled to a shaft 11a of the motor 11 and engaging with the driven gear 80 to transmit power therebetween.

The motor 11 is preferably located under the side sill panel, but is not limited thereto.

The drive gear 12 engages with the driven gear 80 while they being in external contact with each other, thus allowing power to be transmitted from the drive gear 12 to the driven gear 80.

The side deflector 20 is in close contact with an underside of a side-step reinforcement 1a provided in the side step 1 when the side deflector 20 is not deployed, thus reinforcing the side step 1. Thereby, it is possible to more safely use the side step 1.

The side deflector 20 maintains a state in which it is perpendicularly deployed downwards from a lower portion of an end of the side step 1 in the indoor direction.

The side deflector 20 deployed downwards from the side step 1 guides air, introduced from the front when the vehicle is being driven, in the indoor and outdoor directions as well as in a front-rear direction of the vehicle. Therefore, such a configuration can more considerably improve the aerodynamic performance, in comparison with a conventional vehicle simply having the side step.

Moreover, the front deflector 30 includes a fixed bracket 31 coupled to a front end of the side-step reinforcement 1a. A rotary bracket 32 is fixedly coupled to the front end of the side deflector 20. A plurality of intermediate brackets 33 is positioned between the fixed bracket 31 and the rotary bracket 32, and is rotatably hinged at first ends thereof to an end where the fixed bracket 31 overlaps the rotary bracket 32. Each of the intermediate brackets 33 is folded between the fixed bracket and the rotary bracket when the side deflector 20 is not deployed, and is radially unfolded when the side deflector 20 is deployed. A cover plate 34 connects the fixed bracket 31, the rotary bracket 32 and the intermediate brackets 33, thus covering space between the fixed bracket 31, the rotary bracket 32 and the intermediate brackets 33 when the side deflector 20 is deployed.

The front deflector 30 deployed from the front end of the side step 1 prevents the air introduced from the front while the vehicle is being driven from flowing directly into the lower portion of the side step 1 (see arrow M1 of FIG. 6), so that the front deflector 30 can further improve the aerodynamic performance of the vehicle in conjunction with the side deflector 20.

Further, the deployed front deflector 30 serves to reduce the transfer of pressure to the side deflector 20, thus protecting the side deflector 20. In particular, this minimizes the inflow of air to the side deflector 20, thus preventing the side deflector 20 from being contaminated.

Meanwhile, the extent to which the side deflector 20 and the front deflector 30 according to the prevent invention are drawn out from the side step is increased, as a vehicle speed increases. Therefore, it is possible to optimally improve the aerodynamic performance of the vehicle.

As described above, the various embodiments of the present invention provide the variable deflector apparatus, in which it is possible to improve the aerodynamic performance of the vehicle due to the side deflector 20 and the front deflector 30 that are drawn out from the side step 1 in the vehicle configured such that the side step 1 protrudes laterally from the vehicle body 2, thus enhancing the fuel efficiency.

Further, the present invention provides the variable deflector apparatus, in which, as the vehicle speed increases, the extent of the side and front deflectors 20 and 30 drawn out from the side step 1 is actively increased, thus optimally improving the aerodynamic performance.

Furthermore, the present invention provides the variable deflector apparatus, in which the side deflector 20 that is not deployed is in close contact with the underside of the side-step reinforcement 1a, thus reinforcing the side step 1 and allowing the side step 1 to be more stably used.

The present invention is advantageous in that it is possible to improve the aerodynamic performance of a vehicle due to a side deflector and a front deflector that are drawn out from a side step in a vehicle configured such that the side step protrudes laterally from a vehicle body, thus enhancing fuel efficiency.

Further, the present invention is advantageous in that, as a vehicle speed increases, the extent of a side deflector drawn out from a side step is actively increased, thus optimally improving aerodynamic performance.

Furthermore, the present invention is advantageous in that a side deflector that is in a non-deployed state is in close contact with a underside of a side-step reinforcement, thus reinforcing a side step and allowing the side step to be more stably used.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable deflector apparatus for a side step of a vehicle, comprising:
   a drive device;
   a side deflector operated by power transmitted from the drive device, the side deflector configured to be received in the side step when the side deflector is not deployed and to be perpendicularly drawn out downwards from the side step when the side deflector is deployed, thus improving aerodynamic performance of the vehicle; and
   a front deflector connecting a front end of the side step with a front end of the side deflector, the front deflector being kept folded when the side deflector is not deployed and configured to be unfolded to cover a lower portion of the front end of the side step when the side deflector is deployed, thus improving the aerodynamic performance of the vehicle.

2. The variable deflector apparatus of claim 1, further comprising:
   a vehicle-speed sensor; and
   a controller configured to receive a signal from the vehicle-speed sensor to control an operation of the drive device.

3. The variable deflector apparatus of claim 1, further comprising:
   a plurality of support plates provided on an underside of the side deflector to be spaced apart from each other in a direction from a front to a rear of the side deflector;
   a connecting shaft integrally connecting the support plates with each other; and
   a driven gear coupled to the connecting shaft, the driven gear being coupled to the drive device to transmit power therebetween.

4. The variable deflector apparatus of claim 3, wherein the drive device comprises:
   a motor fixedly mounted to a vehicle body in an indoor direction of the vehicle; and
   a drive gear coupled to a shaft of the motor and engaged with the driven gear to transmit power therebetween.

5. The variable deflector apparatus of claim 1, wherein the side deflector is in close contact with an underside of a side-step reinforcement when the side deflector is not deployed, thus reinforcing the side step.

6. The variable deflector apparatus of claim 1, wherein the side deflector is configured to maintain a state in which the side deflector is perpendicularly deployed downwards from a lower portion of an end of the side step in the indoor direction.

7. The variable deflector apparatus of claim 1, wherein the front deflector comprises:
   a fixed bracket coupled to a front end of the side-step reinforcement;
   a rotary bracket fixedly coupled to the front end of the side deflector;
   a plurality of intermediate brackets positioned between the fixed bracket and the rotary bracket, and rotatably hinged at first ends thereof to an end where the fixed bracket overlaps the rotary bracket, each of the intermediate brackets configured to be folded between the fixed bracket and the rotary bracket when the side deflector is not deployed and to be radially unfolded when the side deflector is deployed; and
   a cover plate connecting the fixed bracket, the rotary bracket and the intermediate brackets, thus covering space between the fixed bracket, the rotary bracket and the intermediate brackets when the side deflector is deployed.

8. The variable deflector apparatus of claim 2, wherein an extent to which the side deflector is configured to be drawn out downwards from the side step is increased, as a vehicle speed increases.

* * * * *